(12) United States Patent
Korleski et al.

(10) Patent No.: US 6,938,739 B2
(45) Date of Patent: Sep. 6, 2005

(54) BRAKE HEAD POSITIONER

(75) Inventors: Frank J. Korleski, Mauldin, SC (US);
Roland S. Moore, Taylors, SC (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 0 days.

(21) Appl. No.: 10/328,074

(22) Filed: Dec. 26, 2002

(65) Prior Publication Data

US 2004/0124041 A1 Jul. 1, 2004

(51) Int. Cl.⁷ .......................... B61H 13/36; F16D 65/04
(52) U.S. Cl. .................. 188/220.6; 188/207; 188/236
(58) Field of Search .................. 188/196 R, 220.1, 188/220.6, 221.1, 242–247, 234–236, 1.11 W, 53, 71.7, 71.8, 73.1, 73.31, 79.51, 79.56, 79.63, 197, 198, 202, 205 R, 206 R, 250 F, 250 G, 219.6, 214; 267/234, 242, 260, 265; 403/220, 223, 227, 229

(56) References Cited

U.S. PATENT DOCUMENTS

| | | | | |
|---|---|---|---|---|
| 804,629 A | * | 11/1905 | Shoop | 188/242 |
| 1,169,181 A | * | 1/1916 | Nichols | 188/219.6 |
| 2,516,696 A | * | 7/1950 | Gothberg | 188/221.1 |
| 2,545,213 A | * | 5/1951 | Schlegel, Jr. | 188/221.1 |
| 3,366,136 A | * | 1/1968 | Burton | 267/161 |
| 3,643,766 A | * | 2/1972 | Roush, Jr. | 188/190 |
| 3,696,892 A | * | 10/1972 | Engle | 188/212 |
| 3,743,062 A | * | 7/1973 | McIlroy | 188/212 |
| 4,000,792 A | * | 1/1977 | Guldin | 188/242 |
| 4,406,444 A | * | 9/1983 | Bogenschutz | 267/30 |
| 4,531,717 A | * | 7/1985 | Hebrant | 266/166 |
| 5,974,841 A | * | 11/1999 | Naganuma | 70/186 |
| 6,047,793 A | * | 4/2000 | Hasegawa et al. | 188/1.11 W |
| 6,237,726 B1 | * | 5/2001 | Roick | 188/38 |

\* cited by examiner

Primary Examiner—Thomas Williams
(74) Attorney, Agent, or Firm—The Webb Law Firm

(57) ABSTRACT

A brake head positioning means for railcar braking systems. The brake head positioning means is comprised of an attachment means that is engageable with a railcar hanger arm for attaching such brake head positioning means to such railcar hanger arm. An extension means that is engageable with and extends substantially perpendicular to and outwardly from such attachment means is also included. The extension means provides sliding engagement and enables a biasing force to be achieved. Also included is a variable distancing means which is disposed for sliding engagement with and is substantially perpendicular to such extension means adjacent a first end thereof, and is engageable with a brake head adjacent a second end thereof. A biasing means, disposed around and slideably engageable with such extension means for providing a bias to such variable distancing means during service is further included.

20 Claims, 3 Drawing Sheets

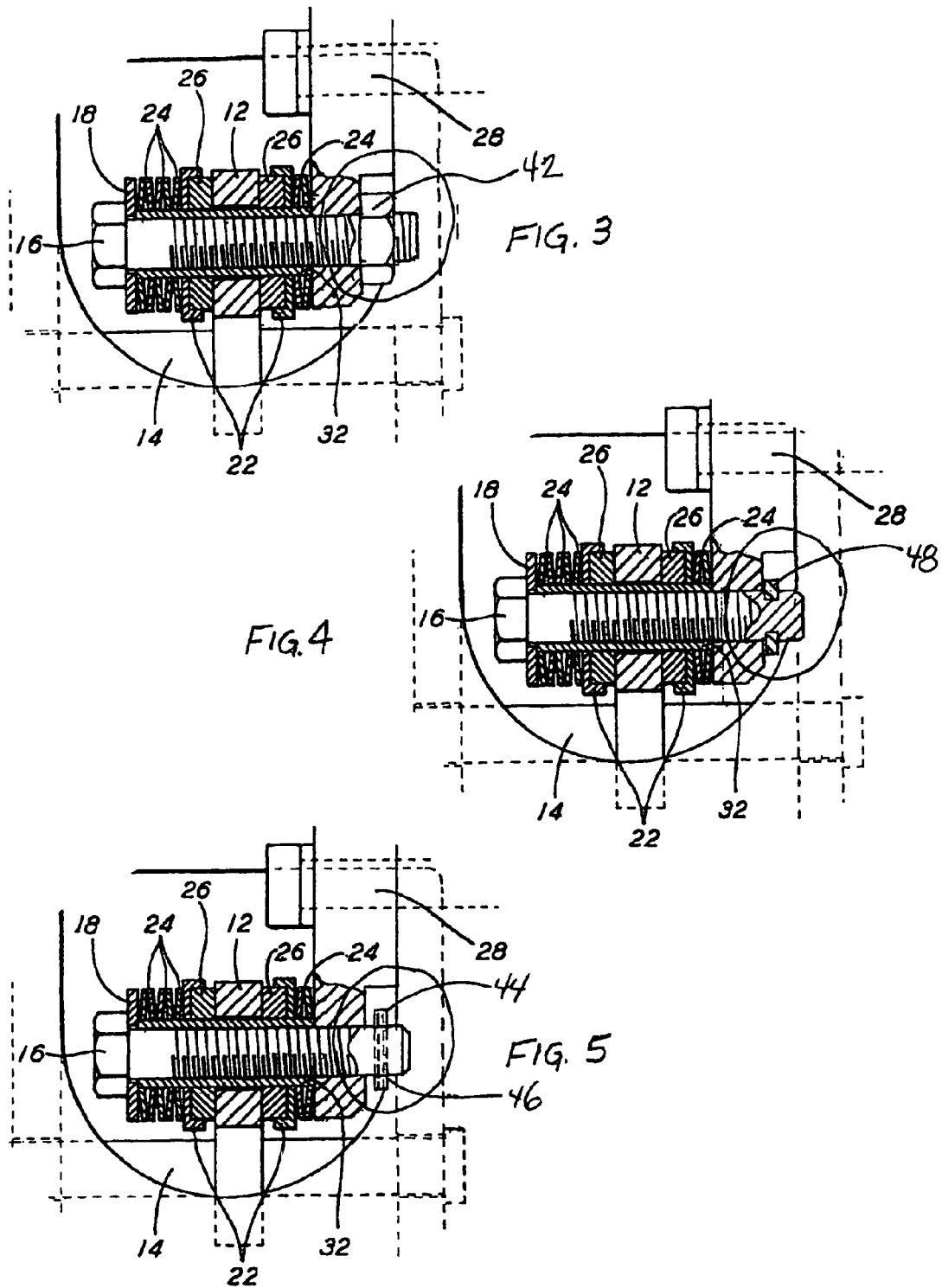

BRAKE HEAD POSITIONER

FIELD OF THE INVENTION

The present invention generally relates to a brake head positioning device. More particularly, the invention relates to a brake head positioning device that is universally mountable and offers uniform brake shoe clearance.

BACKGROUND OF THE INVENTION

The use of brake head position devices in the railway industry is well known. They are utilized in the quest to obtain uniform brake shoe wear, which in turn prolongs brake shoe life and offers the economies associated with such a result.

Prior art brake head position devices use a brake head positioning spring consisting of metal friction washers and springs to hold the brake head for even brake shoe clearance upon release of the brake. These prior art designs are a compromise as they are optimized for mid-brake shoe and wheel wear conditions. Use of a prior art brake positioning device can result in the brake shoe touching the wheel tread at either the top or bottom when conditions of no wear or full wear exist among the varying wheel/brake shoe wear parameters. This can result in shoe wear at either the top of bottom of the shoe and require shoe changes before complete shoe wear is accomplished. This shoe wear could adversely affect braking performance due to less shoe surface being applied to the wheel.

Other brake head positioning devices are designed only for a specific adaptability to their respective brake head hanger assemblies.

SUMMARY OF THE INVENTION

In one aspect, the present invention generally features a brake head positioning device for railcar braking systems. The brake head positioning device is comprised of an attachment device that is engageable with a railcar hanger arm for attaching such brake head positioning means to such railcar hanger arm. An extension mechanism that is engageable with and extends substantially perpendicular to and outwardly from such attachment means is also included. The extension mechanism provides sliding engagement and enables a biasing force to be achieved. Also included is a variable distancing device which is disposed for sliding engagement with and is substantially perpendicular to such extension means adjacent a first end thereof, and is engageable with a brake head adjacent a second end thereof. A biasing mechanism, disposed around and slideably engageable with such extension means for providing a bias to such variable distancing means during service is further included.

OBJECTS OF THE INVENTION

It is, therefore, one of the primary objects of the present invention to provide a brake head positioner which provides for even brake shoe clearance for each brake application and release throughout the life of the brake shoe and the wheel wear conditions.

It is, therefore, another object of the present invention to provide a brake head positioner which improves brake shoe life with its attendant economy to the operating costs.

It is, therefore, still a further object of the present invention to provide a brake head positioner which allows for the use of the brake head positioning device not only for new installations but for existing brake head and the hangers presently installed on existing trucks.

In addition to the above-described objects and advantages of the brake head positioning means, various other objects and advantages of the present invention will become more readily apparent to the persons who are skilled in the same and related arts from the following more detailed description of the invention, particularly, when such description is taken in conjunction with the attached drawing figures and the appended claims.

DESCRIPTION OF THE DRAWING

FIG. 3 is a side elevational view of an alternate embodiment of the present invention, partially in cross section.

FIG. 4 is a side elevational view of an alternate embodiment of the present invention, partially in cross section.

FIG. 5 is a side elevational view of an alternate embodiment of the present invention, partially in cross section.

DETAILED DESCRIPTION OF THE PRESENTLY PREFERRED EMBODIMENT

Figure 1:
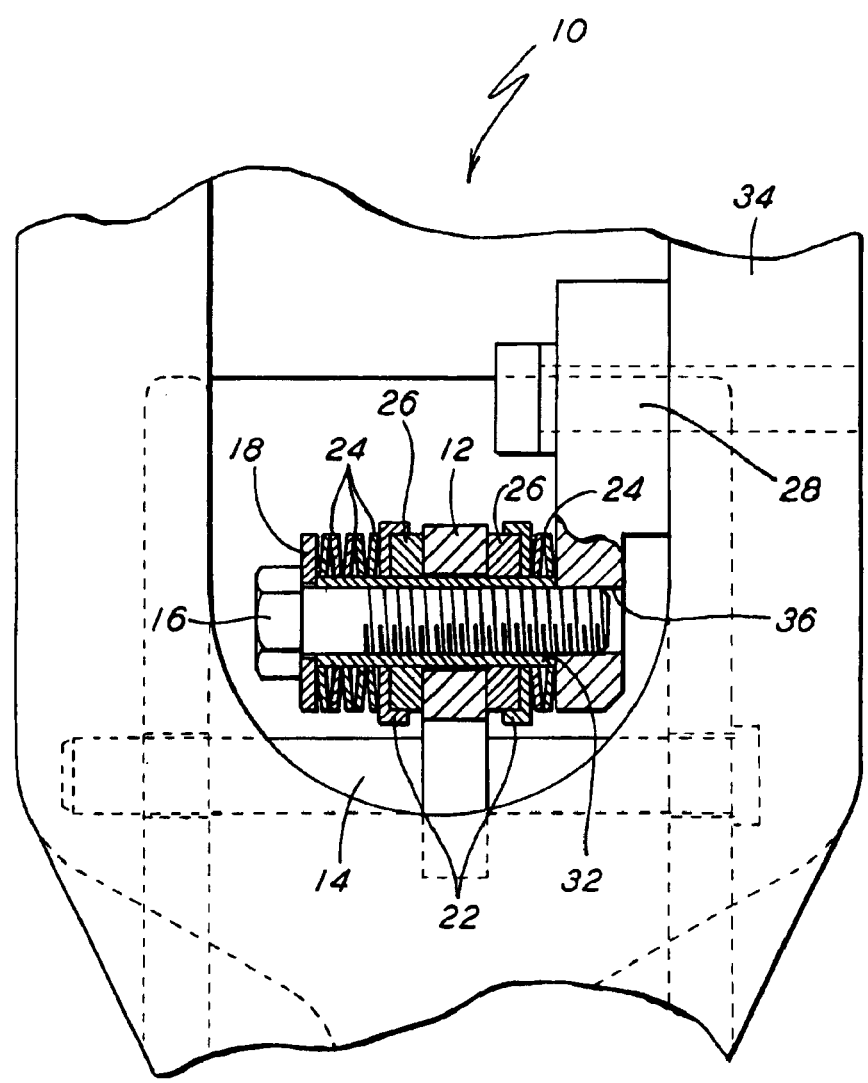
FIG. 1 is a side elevational view of the present invention, partially in cross section.
Figure 2:
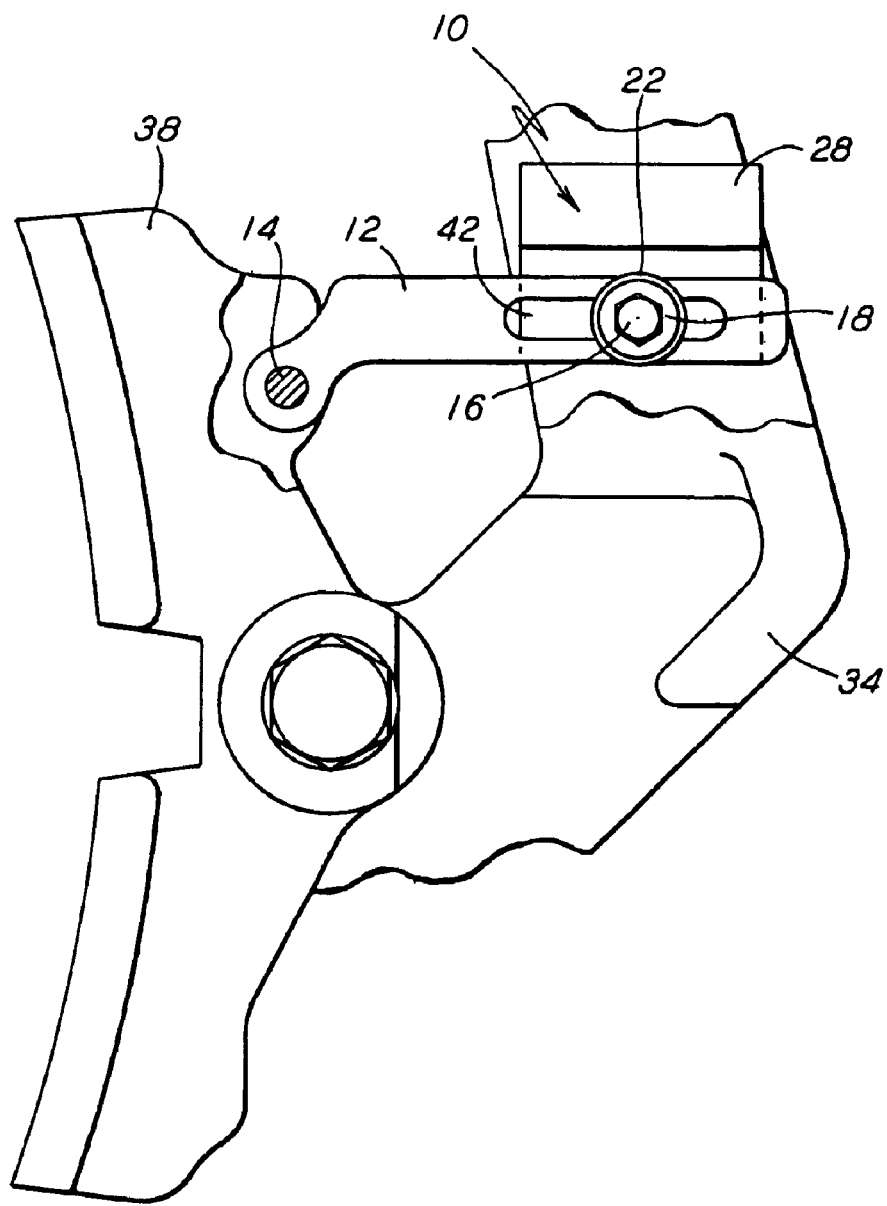
FIG. 2 is a side view of the present invention connected to a brake shoe.

Prior to proceeding to a much more detailed description of the present invention, it should be noted that identical components which have identical functions have been identified with identical reference numerals throughout the several views illustrated in the drawing figures for the sake of clarity and understanding of the invention.

Referring initially to FIG. 1 a brake head positioning means constructed according to the present invention is generally indicated by reference numeral 10. The brake head positioning means 10 of the present invention generally includes a variable distancing means (12), a clevis pin (14), an extension means (16), a spring seat (18), capturing washers (22), at least one biasing means (24), friction washers (26), an attachment means (28), and a shoulder sleeve (32).

The present invention will now be described by way of a particular preferred embodiment, reference being had to the accompanying drawings, wherein the brake head positioning means (10) is assembled and operates in the following manner.

An attachment means (28) is engageable with a railcar hanger arm (34) for attaching the brake head positioning means (10) to the railcar hanger arm (34). In the presently preferred embodiment, the attachment means (28) includes a threaded aperture (36) for threaded engagement of a bolt. A bolt is used as the extension means (16) in the presently preferred embodiment, and provides a sliding engagement and enables a biasing force to be achieved. The extension means (16) is engageable with and extends substantially perpendicular to and outwardly from the attachment means (28).

The extension means (16) could also be one of a shaft with threaded portion for engagement with a nut adjacent an outer end thereof, a shaft with a radial groove formed adjacent an outer end thereof for receipt of a locking clip therein, or a shaft with an axially perpendicular aperture for receipt of a locking pin adjacent an outer end thereof. It also possible to cast the attachment means (28) and the extension means (16) as a single piece.

The extension means (16) includes a shoulder sleeve (32) disposed around a predetermined length of the extension means (16). The shoulder sleeve (32) maintains proper alignment of the positioning means (10) throughout the life of the friction washer (26). The length of the shoulder sleeve (32) is designed to allow the belleville spring washers (24) to fully compress, while preventing the extension means (16) from being over tightened and creating excessive force that could damage the positioning means (10).

A variable distancing means (12) is disposed for sliding engagement with and is substantially perpendicular to the extension means (16) adjacent a first end thereof. The variable distancing means (12) is engageable with a brake head (38) adjacent a second end thereof. The variable distancing means (12) further includes a slot-like opening (42) adjacent a first end thereof and a hole, of a predetermined diameter, at a second end thereof. The positioning means (10) further includes a means for attaching the variable distancing means (12) to the brake head (38).

In the presently preferred embodiment, the means for attaching the distancing means to such brake head is a clevis pin (14). The clevis pin (14) is hardened to a depth of at least about 0.025 inch and to a hardness of at least about Rockwell A-76.

At least two biasing means (24) are disposed around and are slideably engageable with the extension means (16) and provide a bias to the variable distancing means (12) during service. In the presently preferred embodiment, the biasing means (24) are springs, preferably belleville spring washers (24) made from stainless steel. The spring force created by the belleville spring washers (24) on the friction washers (26) holds the variable distance means (12) in position until brake applications create enough force to move it. This spring force in turn positions the brake head (38) for even shoe clearance upon release of the brakes.

The brake head positioning means further includes a spring seat (18) disposed around the extension means (16) and is adjacent a second end of one of the at least two biasing means (24) and is adjacent the extension means (16) at an outer end thereof.

The brake head positioning means further includes a predetermined plurality of friction washers (26) disposed around the extension means and are engageable with such variable distancing means (12). The friction washers (26) will wear to a point that the capturing washers (22) will touch the positioning bar before the belleville spring washers (24) fully expand. This is used as a means to identify wear of such friction washers (26) in the presently preferred embodiment.

The brake head positioning means (10) further includes a predetermined plurality of capturing washers (22) for holding the friction washers (26) in place. One of the capturing washers is disposed around the extension means (16) and is between a first one of the friction washers (26) and a first end of one of such at least two biasing means (24). A second one of such capturing washers (22) is disposed around the extension means (16) and is between a second one of the friction washers (26) and a first end of another one of the at least two biasing means (24). Each of the capturing washers (22) includes a recess having a predetermined depth and a predetermined diameter.

While the present invention has been described by way of a detailed description of a particularly preferred embodiment, it will be readily apparent to those of ordinary skill in the art that various substitutions of equivalents may be affected without departing from the spirit or scope of the inventions set forth in the appended claims.

We claim:

1. A brake head positioning means for railcar braking systems, said brake head positioning means comprising:

(a) an attachment means engageable with a railcar hanger arm for attaching said brake head positioning means to such railcar banger arm;

(b) an extension means engageable with and extending substantially perpendicular to and outwardly from said attachment means for providing sliding engagement and enabling a biasing force to be achieved;

(c) a variable distancing means, said variable distancing means disposed for sliding engagement with and substantially perpendicular to said extension means adjacent a first end thereof, and engageable with a brake head adjacent a second end thereof;

(d) at least two biasing means, disposed around said extension means and slideably engageable with said extension means for providing a bias so said variable distancing means during service;

(e) friction washers between the variable distancing means and the biasing means; and (f) a plurality of capturing washers, one of said capturing washers disposed around said extension means and between a first one of a pair of friction washers and a first end of one of said at least two biasing means, and a second one of said capturing washers disposed around said extension means and between a second one of said pair of friction washers and a first end of another one of said at least two biasing means.

2. A brake head positioning means for railcar braking systems according to claim 1, wherein said extension means includes a threaded portion for engagement with a nut adjacent an outer end thereof.

3. A brake head positioning means for railcar braking systems according to claim 1, wherein said brake head positioning means further includes a shoulder sleeve disposed around a predetermined length of said extension means.

4. A brake head positioning means for railcar braking systems according to claim 1, wherein each of said capturing washers includes a recess having a predetermined depth and a predetermined diameter.

5. A brake head positioning means for railcar braking systems according to claim 1, wherein said brake head positioning means further includes a spring seat disposed around said extension means and adjacent a second end of said one of at least two biasing means and adjacent said extension means at an outer end thereof.

6. A brake head positioning means for railcar braking systems according to claim 1, wherein said distancing means includes a slot opening adjacent a first end thereof and an aperture of a predetermined diameter at a second end thereof.

7. A brake head positioning means for railcar braking systems according to claim 6, wherein said brake head positioning means further includes a means for attaching said distancing means to such brake head.

8. A brake had positioning means for railcar braking systems according to claim 7, wherein said means for attaching said distancing means to such brake head is a clevis pin.

9. A brake head positioning means for railcar braking systems according to claim 1, wherein said attachment means and said extension means are cast as a single piece.

10. A brake head positioning means for railcar braking systems according to claim 1, wherein said biasing means are belleville spring washers.

11. A brake head positioning means for railcar braking systems according to claim 1, wherein said brake head positioning means further includes a means to identify wear of said friction washers.

12. A brake head positioning means for railcar braking systems according to claim 1, wherein said extension means includes a threaded portion for engagement with a nut adjacent an outer end thereof.

13. A brake head positioning means for railcar braking systems, said brake head positioning means comprising:
    (a) an attachment means engageable with a railcar hanger arm for attaching said brake head positioning means to such railcar hanger arm;
    (b) an extension means engageable with and extending substantially perpendicular to and outwardly from said attachment means for providing sliding engagement and enabling a biasing force to be achieved, and a shoulder sleeve disposed around a predetermined length of said extension means;
    (c) a variable distancing means, said variable distancing means disposed for sliding engagement with and substantially perpendicular to said extension means adjacent a first end thereof, and engageable with a brake head adjacent a second end thereof;
    (d) a biasing means disposed around said extension means and slideably engageable with said shoulder sleeve disposed around extension means for providing a bias to said variable distancing means during service;
    (e) friction washers abutting the variable distance means; and
    (f) a plurality of capturing washers, one of said capturing washers disposed around said shoulder sleeve and extension means and between a first one of a pair of friction washers and a first end of said biasing means, and a second one of said capturing washers disposed around said shoulder sleeve and extension means and abutting a second one of said pair of friction washers.

14. A brake head positioning means for railcar braking systems according to claim 13, wherein each of said capturing washers, includes a recess having a predetermined depth and a predetermined diameter.

15. A brake head positioning means for railcar braking systems according to claim 13, wherein said brake head positioning means further includes a spring seat disposed around said extension means and adjacent said biasing means and adjacent said extension means at an outer end thereof.

16. A brake head positioning means for railcar braking systems according to claim 13, wherein said distancing means includes a slot opening adjacent a first end thereof and an aperture of a predetermined diameter at a second end thereof.

17. A brake head positioning means for railcar braking systems according to claim 16, wherein said brake head positioning means further includes a means for attaching said distancing means to such brake head.

18. A brake head positioning moans for railcar braking systems according to claim 17, wherein said means for attaching said distancing means to such brake head is a clevis pin.

19. A brake head positioning means for railcar braking systems according to claim 13, wherein said attachment means and said extension means are cast as a single piece.

20. A brake head positioning means for railcar braking systems according to claim 13, wherein said brake head positioning means further includes a means to identify wear of said friction washers.

* * * * *

UNITED STATES PATENT AND TRADEMARK OFFICE
CERTIFICATE OF CORRECTION

PATENT NO. : 6,938,739 B2
DATED : September 6, 2005
INVENTOR(S) : Korleski et al.

It is certified that error appears in the above-identified patent and that said Letters Patent is hereby corrected as shown below:

Title page,
Item [56], References Cited, U.S. PATENT DOCUMENTS, "2,545,213    5/1951" should read -- 2,545,213    3/1951 --.

Column 4,
Line 3, "railcar banger arm;" should read -- railcar hanger arm; --.
Line 16, "a bias so said" should read -- a bias to said --.
Line 56, "A brake had" should read -- A brake head --.

Column 6,
Line 22, "positioning moans" should read -- positioning means --.

Signed and Sealed this

Seventh Day of March, 2006

JON W. DUDAS
*Director of the United States Patent and Trademark Office*